United States Patent
Thorne

(10) Patent No.: US 10,314,292 B2
(45) Date of Patent: Jun. 11, 2019

(54) PET CALMING AND SOOTHING SYSTEM

(71) Applicant: Robert L. Thorne, Belleville, MI (US)

(72) Inventor: Robert L. Thorne, Belleville, MI (US)

(73) Assignee: Snuggle Pet Products, LLC, Novi, MI (US)

( * ) Notice: Subject to any disclaimer, the term of this patent is extended or adjusted under 35 U.S.C. 154(b) by 226 days.

(21) Appl. No.: 14/869,296

(22) Filed: Sep. 29, 2015

(65) Prior Publication Data

US 2016/0088818 A1    Mar. 31, 2016

Related U.S. Application Data

(60) Provisional application No. 62/057,402, filed on Sep. 30, 2014.

(51) Int. Cl.
*A22C 29/00*    (2006.01)
*A01K 27/00*    (2006.01)
*A01K 15/02*    (2006.01)

(52) U.S. Cl.
CPC .......... *A01K 27/009* (2013.01); *A01K 15/021* (2013.01); *A01K 15/025* (2013.01); *A01K 27/002* (2013.01); *A01K 27/008* (2013.01)

(58) Field of Classification Search
CPC .... A01K 27/008; A01K 29/00; A01K 27/009; A01K 27/002; A01K 15/025; A01K 15/021
USPC ................. 119/769, 792, 793, 850, 855, 856
See application file for complete search history.

(56) References Cited

U.S. PATENT DOCUMENTS

| | | | | |
|---|---|---|---|---|
| 3,159,140 A | * | 12/1964 | Miller | A01K 27/001 119/719 |
| 6,679,198 B1 | * | 1/2004 | LaGarde | A01K 15/02 119/792 |
| 6,912,976 B2 | * | 7/2005 | Everett | A01K 15/027 119/712 |
| 7,281,363 B2 | * | 10/2007 | Woerner | A01K 27/008 119/858 |
| 7,918,192 B1 | * | 4/2011 | Digh | A01K 13/006 119/850 |
| 8,336,506 B2 | * | 12/2012 | Zimmerman | A01K 1/0263 119/856 |
| 8,539,913 B2 | * | 9/2013 | Caputo | A01K 15/02 119/850 |
| 2007/0099538 A1 | * | 5/2007 | Friedland | A63H 3/28 446/342 |
| 2007/0227463 A1 | * | 10/2007 | Polito | A01K 1/0218 119/707 |

(Continued)

*Primary Examiner* — Richard T Price, Jr.
(74) *Attorney, Agent, or Firm* — Miller Canfield Paddock and Stone; Mark L Maki

(57) ABSTRACT

The invention relates to device for soothing and calming an animal. In one embodiment, the device comprises a toy-shaped structure filled with soft stuffing material for an animal to lie against, the filler stuffing material at least partially defining a pouch within a central opening in the toy adapted to removably receive a modular simulator. The modular simulator generating rhythmic soothing acoustic sounds that simulate the actual breathing of the animal's mother and to communicate said breathing sound to the animal when lying against the toy structure. In another embodiment, the sound simulator is disposed in a pouch provided on a harness, the pouch being in proximity to the heart of the animal.

18 Claims, 1 Drawing Sheet

(56) References Cited

U.S. PATENT DOCUMENTS

| | | | | |
|---|---|---|---|---|
| 2009/0156089 | A1* | 6/2009 | Hoard | A63H 3/001 |
| | | | | 446/297 |
| 2009/0292343 | A1* | 11/2009 | Sternlight | A01K 13/006 |
| | | | | 607/112 |
| 2013/0231522 | A1* | 9/2013 | Krans | A61B 5/08 |
| | | | | 600/26 |
| 2013/0310636 | A1* | 11/2013 | Krans | A61B 5/08 |
| | | | | 600/26 |
| 2014/0311423 | A1* | 10/2014 | Roney, III | A01K 27/002 |
| | | | | 119/792 |
| 2015/0112121 | A1* | 4/2015 | Eyrun | A63H 3/001 |
| | | | | 600/28 |
| 2016/0029963 | A1* | 2/2016 | Hyde | A61B 5/1171 |
| | | | | 600/301 |
| 2017/0087726 | A1* | 3/2017 | Gnana | B25J 11/0005 |

* cited by examiner

PET CALMING AND SOOTHING SYSTEM

CROSS-REFERENCE TO RELATED APPLICATIONS

This application is a completion application of U.S. Provisional Application Ser. No. 62/057,402, filed Sep. 30, 2014, for "Pet Calming and Soothing System," the entire disclosure of which is hereby incorporated by reference in its entirety including the drawings.

BACKGROUND OF THE INVENTION

1. Field of the Invention

The present invention pertains to a system for calming and soothing a pet, such as a dog or cat. More particularly, this invention relates to the provision of an apparatus simulating the breathing sound of a pet's mother, the simulating apparatus disposed in an apparatus used with the animal, such as inside a stuffed animal toy or pocket of an animal harness.

2. Description of the Prior Art

It is known that canines and other animals become hyperactive during a long travel or being left unattended in a vehicle. Additionally, puppies may become disoriented and tend to bark after coming to a new home and being alone or separated from its mother. When puppies are separated from their litter, or their birthmother, separation anxiety can become a major problem. The change in environment can put a lot of stress on a young puppy. At bed time, puppies whine when they should be sleeping and keep everyone awake. Sometimes older dogs don't like to be left alone or are afraid of thunder.

Efforts have been expended to develop solutions to help dogs overcome anxiety, restore calm and sleep peacefully.

It is also known that dogs are pack animals and instinctively calm down when they are near another beating heart. A pulsating device to reproduce the beating heart is commercially available such as is sold under the name SnugglePuppie Heart Beat.

In this regard, certain plush stuffed animal toys, particularly adapted for dogs and cats, can include a pulsating device disposed in an interior pouch, which simulates a heartbeat. When the animal engages the stuffed toy, i.e. lies down next to or on the toy and senses the pulsation, the pulsing calms the animal.

In U.S. Provisional Application Ser. No. 61/820,435, filed May 7, 2013, for "Animal Harness," the entire disclosure of which, including the drawings, is hereby incorporated by reference, discloses an animal harness which includes a pouch that receives and positions a pulsating heartbeat device in contact with the chest of animal for calming the animal during travel and while resting in a vehicle.

The pulsing heartbeat device described hereinabove is believed to have been a positive development in addressing and keeping an animal calm.

The above information and publication is identified herein in recognition of a duty of disclosure of related subject matter, which may be relevant under 37 CFR 1.56, and specifically incorporated herein by reference as regards to the conventional approaches and constructions taught therein.

Yet, there is an ongoing need to provide additional arrangements for calming and soothing canines and other animals, especially a young pet separated from its birthmother and brought to the pet owner's home. The loneliness of such separation can present problems.

Today we know that a rhythmic sound has the power to alter human brain wave patterns, driving the mind into a relaxed or even into a deep meditative state.

Sound therapy can help alleviate anxiety by re-training the brain to relax, cooling down a "fight-or-flight response" and nurturing a "relaxation response." Through sound therapy, a general anxiety level can be lowered and a "relaxation response" empowered.

Thus, a solution to the animal anxiety problem problem for calming or otherwise soothing an animal using sound therapy is embodied in the invention herein.

SUMMARY OF THE INVENTION

The present invention provides, in a first embodiment, an animal soothing system comprising a stuffed toy structure for an animal to lie against, said toy structure including: (a) an interior, substantially filled with soft stuffing material, the filler stuffing material defining, at least in part, a pouch; and (b) an artificial soothing means. The soothing means generate rhythmic soothing acoustic sounds that simulate the actual breathing of an animal's mother and communicate an artificial soothing means, wherein the pouch removably retains the soothing means, to the animal when lying against the toy structure.

Preferably, the acoustic breathing sound is provided by a modular simulator, the simulator being battery powered and including means for actuating and turning the simulator on and off.

It should be noted that such artificial breathing simulators are well-known and commercially available.

In one arrangement, the modular simulator includes a pressure sensitive switch for activation thereof when the animal places its weight upon the exterior of said toy structure and for deactivation thereof when the animal removes its weight from said toy structure.

Additionally, the toy includes an exterior surface that defines the shape of the toy, an opening in the surface, and a removable cover, the cover providing removable closure and an access to the interior pouch thereof for servicing or removing the modular simulator from the cavity.

Preferably, the filler material is such as to provide a pouch that is semi-permanent in shape and complementary to the shape of the modular simulator to ensure proper positioning of the simulator in the cavity.

Furthermore, in some embodiments, there is provided, in addition to the sound simulator in the pouch, a pulsing, battery-powered heartbeat device to provide a combination of tactilely perceptible vibrations as well as the acoustic breathing sounds of an animal.

Preferably, the stuffed toy structure is in the form of a dog for the puppy or dog to lie against. However, the form may be otherwise, such as a pad or other structure that the dog may lie against.

Additionally, while discussed in terms of a dog, the invention extends to use in soothing or calming a cat as well as other domestic and domesticated animals.

Depending on whether for use with a dog, cat, or other animal, the user would select a modular simulator such that the rhythmic soothing acoustic sounds from the module will simulate the actual breathing of the animal's mother and will communicate said breathing sound to the specific animal when lying against the toy structure.

In another aspect of this invention there is provided an animal harness, the harness comprising a webbing that encircles the neck and shoulders of an animal, and a pouch secured to the webbing, the webbing being configured to position the pouch to be in contact with the chest of the animal. A modular simulator is disposed within the pouch, the modular simulator for generating rhythmic soothing acoustic sounds that simulate the actual breathing of the animal's mother and which is communicated to the animal when lying against the toy structure to thereby calm and soothe the animal.

Preferably, the modular simulator for generating an acoustic breathing sound is battery powered and includes control means for actuating and turning the simulator on and off, the control means being manipulated by the animal's owner.

According to this invention, the artificial soothing means that generate rhythmic soothing acoustic sounds that simulate the actual breathing of the animal's mother and to communicate said breathing sound to the animal when lying against the toy structure can help ease a pet's anxiety and help soothe and calm the pet, especially when coupled with a pulsing device.

The stuffed toy structure, such as in the form of a dog, presents a puppy with a like sleeping littermate, which is great for new puppies and even senior dogs.

The present invention will be more clearly understood with reference to the accompanying drawings and to the following Detailed Description, in which like reference numerals refer to like parts and where:

DETAILED DESCRIPTION OF THE PREFERRED EMBODIMENT

Figure 1:
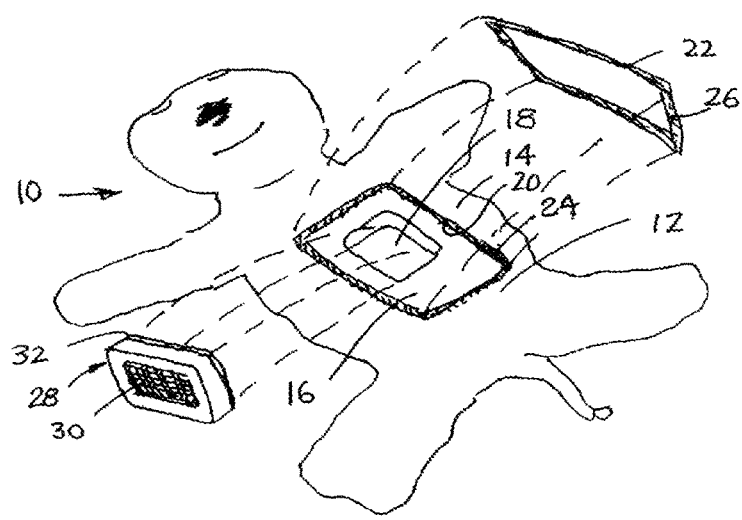
FIG. 1 is a plan view of a stuffed toy animal provided with a modulator simulator for generating rhythmic soothing acoustic sounds in accordance with the present invention.

Turning now to the drawings, FIG. 1 illustrates a stuffed toy animal 10, in the form of a dog, viewing the belly 12 of the toy dog while lying on its back. The toy animal could be other than that of a dog, such as in the shape of a cat/kitten or other animal, or mattress/pillow, which an animal to be calmed or soothed lies against.

In the embodiment shown, the toy animal 10 has an exterior surface 14 that forms an interior that is filled with a soft microfiber or like filler material 16. The filler material 16 is selected to be soft, compliant, and adapted to form an inviting structure for the animal to rest against. Illustrative fillers would include the polymeric foam filler materials such as used in sleeping pillows. Preferably, the filler material 16 is semi-rigid in that the material cooperates to form an accessible pouch or chamber or cavity 18.

A central opening 20 is formed on the belly 12 of the toy 10, the opening 20 being disposed in superposing or encircling relation with the pouch 18.

A closure or cover 22 is adapted to be removably positioned in covering relation with the opening 20 in the belly 12. As shown, the exterior surface of the toy 10 that encircles the perimeter of the central opening 20 is provided with hook and loop (Velcro) straps 24 that are adapted to releasably secure and engage with corresponding hook and loop (Velcro) straps 26 on the bottom of the cover 22.

Alternatively, the central opening 20 in the belly 12 could comprise an elongated longitudinally extending slot, the edges of the slot being adapted to be pried laterally apart whereby to define a closable opening that is disposed in superimposed relation with the pouch 18. The abutted edges that form the slot would be provided with engageable strips of hook and loop (Velcro) straps.

In some applications, an access opening 20 to the toy interior and pouch 18 thereof could be opened and closed using a zipper.

Importantly, an artificial soothing means is adapted to be removably placed in the pouch 18. As shown, the soothing means is in the form of a modular simulator 28 that is adapted to generate rhythmic soothing acoustic sounds that simulate the actual breathing of an animal, such as that of the dog's mother, and to communicate that breathing sound to the animal when lying against the toy structure 10. The breathing sounds are produced by a sound generator in the simulator 28, the sounds being pre-selected or pre-programmed to replicate a desired breathing or purring of a dog, cat, or other animal.

The modular simulator 28 includes an accessible chamber, within which is mounted a sound generator that produces the acoustic breathing sound of the modular simulator 28, batteries (not shown) to power the sound generator, and actuation means (not shown) in the form of a switch arrangement connecting the sound generator to the batteries for actuating and turning the simulator on or off and generate or stop the breathing sounds. A top surface of the simulator includes a speaker element 30 to direct the sound waves. When disposed in the pouch 18, the speaker element 30 atop the simulator 28 is positioned to face the closure opening 22 to direct the breathing sounds upwardly from the underside or belly 12 of the toy 10.

In one arrangement, the switch arrangement includes a pressure sensitive switch for activation of the sound generator thereof when the animal places its weight upon the exterior of said toy structure 10 and for deactivation thereof when the animal removes its weight from said toy structure 10.

In use or in another arrangement, the pressure sensitive switch is manually operated by the user. This manual switch actuation could be done by the animal owner when the animal is asleep or calmed, so as to save on battery life.

The modular simulator 28 includes a removable closure or door 32 to access the batteries mounted in a chamber thereof used to power the sound generating element therewithin. In servicing, the battery door 32 is removed, the batteries placed or exchanged, and the door 32 closed. The simulator 28 is placed in the underside pouch 18 and the hook and loop strips 24 and 26 fastened together. Pressure against the speaker element 30 of the modular simulator 28 acts to switch the power on or off.

Generally, the toy 10 is such that one size fits all, whether intended for a dog, cat, or other animal. The toy 10 dimensions are approximately 12 inches long, 8 inches wide, and 3 inches high. Even day-old orphans can find a place to cozy up into.

The rhythmic acoustic sound frequency provided by the modulator simulator 28 will depend on the animal intended to be calmed. Dogs have a much different range of hearing than humans, extending into a considerably higher frequency than humans can hear. The higher the frequency, the more sound waves per second, the higher-pitched the sound. Humans hear best at around 2,000 Hz; dogs hear best at 8,000 Hz—perhaps the reason they respond better to high pitched cues.

Cats purr during both inhalation and exhalation with a consistent pattern and frequency between 25 and 150 Hertz. Purring is an auditory stimulus that people attribute to peacefulness and calmness. Various investigators have shown that sound frequencies in this range can improve bone density and promote healing and medically therapeutic for many illnesses.

The differences in acoustic responses of animals are reflected in the modular simulator 28 selected for use.

Figure 2:
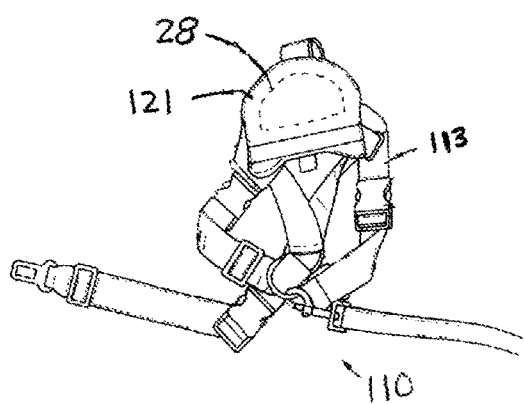
FIG. 2 is a perspective view of an animal harness having a pouch that allows for the insertion of a modulator simulator in contact with the chest of the animal.

Referring to FIG. 2, in another aspect of this invention, there is provided an animal harness 110, such as shown and described in the above-incorporated Ser. No. 61/820,435. The harness 110 comprises a loop of webbing 113 that encircles the back, neck, and shoulder of the animal. A pouch 121 is affixed to the loop 113 and positioned to be placed in contact with the chest of the animal.

According to this embodiment, the modular simulator 28 is disposed within the pouch 121.

In this application, using the harness 110, the modular simulator 28 is turned on or off by the owner, as needed, such as during long trips in a car.

In some applications, whether using the stuffed toy animal 10 or the harness 110, the user may provide in the pouch or cavity 18 of the toy or the pouch 121 of the harness 110 both a pulsing, battery-powered heartbeat device to provide a combination of tactilely perceptible vibrations as well as the acoustic rhythmic breathing sounds of an animal from the battery-powered modular simulator 28 described hereinabove and according this invention.

The heartbeat device and the modular simulator 28 are placed adjacent to one another within the same pouch 18 of the central opening 20. While both the heartbeat device and the modular simulator 28 are each separately battery-powered, they may be structured in such a way to utilize a single battery source and conserve power.

Having, thus, described the invention, what is claimed is:

1. A pet calming system comprising:
   (a) a pouch; and
   (b) a modular simulator disposed within the pouch, the modular simulator comprising a sound generator generating rhythmic soothing acoustic sounds that simulate actual animal breathing, said sound generator comprising a speaker element, and said modular simulator further comprising a switch arrangement for connecting the sound generator to a battery supply to turn the simulator on and off, said switch arrangement further comprising a pressure sensitive switch cooperating with said speaker element wherein said pressure sensitive switch is activated by pressure acting against said pressure sensitive switch.

2. The pet calming system of claim 1 further comprising a toy filled with filler material, the toy comprises: a central opening on a surface of the toy wherein the pouch, at least partially defined by the filler material, is situated; and a cover to the central opening being at least partially detachably connected to the central opening.

3. The pet calming system of claim 2 wherein the toy is a pillow.

4. The pet calming system of claim 2 wherein the toy is in the shape of a dog.

5. The pet calming system of claim 2 wherein the modular simulator further comprises: an accessible sound chamber for situating the sound generator; and
   an accessible battery chamber for situating said battery supply.

6. The pet calming system of claim 2 wherein said pressure sensitive switch is activated when a pet places its weight on the toy and is deactivated when the pet removes its weight from the toy.

7. The pet calming system of claim 1 wherein the modular simulator further comprises: an accessible sound chamber for situating the sound generator; and an accessible battery chamber for situating a battery supply.

8. The pet calming system of claim 1 wherein said pressure sensitive switch is activated when a pet places its weight on the speaker element within the pouch and is deactivated when the pet removes its weight from the speaker element within the pouch.

9. The pet calming system of claim 1 further comprising a harness, the harness comprising a looped webbing encircling the neck, shoulders, and back of an animal, and the pouch being secured to the webbing and in contact with the chest of the animal.

10. The pet calming system of claim 9 wherein the modular simulator further comprises: an accessible sound chamber for situating the sound generator; and an accessible battery chamber for situating a battery supply.

11. The pet calming system of claim 10 wherein said pressure sensitive switch is activated when pressure is applied on the speaker element and is deactivated when the pressure is removed from the speaker element.

12. A pet calming system comprising:
    (a) a harness, the harness comprising a looped webbing encircling the neck, shoulders, and back of an animal
    (b) a pouch, the pouch being secured to the webbing and in contact with the chest of the animal; and
    (c) a modular simulator disposed within the pouch, the modular simulator further comprising a sound generator generating rhythmic soothing acoustic sounds that simulate actual animal breathing, said modular simulator further comprising: an accessible sound chamber for situating the sound generator; an accessible battery chamber for situating a battery supply; and a switch arrangement for connecting the sound generator to the battery supply to turn the simulator on and off, wherein said switch arrangement comprises a pressure sensitive switch which is activated when a pet places its weight on the pressure sensitive switch and is deactivated when the pet removes its weight from the pressure sensitive switch.

13. A pet calming system comprising:
    (a) a toy;
    (b) a pouch, the pouch disposed within the toy; and
    (c) a modular simulator disposed within the pouch, the modular simulator further comprising a sound generator generating rhythmic soothing acoustic sounds that simulate actual animal breathing, said modular simulator including a speaker element which includes a switch arrangement that further comprises a pressure sensitive switch which is activated when a pet applies pressure to the speaker element within the pouch to generate said acoustic sounds and is deactivated when the pet removes the pressure from the speaker element.

14. The pet calming system of claim 13 wherein the toy is filled with filler material and further comprises: a central opening on a surface of the toy wherein the pouch, at least partially defined by the filler material, is situated; and a cover to the central opening being at least partially detachably connected to the central opening.

15. The pet calming system of claim 14 wherein the toy is a pillow.

16. The pet calming system of claim 14 wherein the toy is in the shape of a canine or feline, the simulated sound representing the breathing of a canine or feline.

17. The pet calming system of claim 16 wherein the modular simulator further comprises: an accessible sound chamber for situating the sound generator; an accessible battery chamber for situating a battery supply; and said switch arrangement for connecting the sound generator to the battery supply to turn the simulator on and off.

18. The pet calming system of claim 17 wherein the switch arrangement comprises said pressure sensitive switch which is activated when an animal places its weight on the toy and said pressure sensitive switch therein and is deactivated when the animal removes its weight from the toy.

* * * * *